Oct. 16, 1956  B. McCOLLUM  2,766,837
SEISMIC EXPLORATION APPARATUS
Filed Nov. 5, 1951  4 Sheets-Sheet 1

Burton McCollum
INVENTOR.

BY Lewis H. Wilson
ATTORNEY

Oct. 16, 1956

B. McCOLLUM

2,766,837

SEISMIC EXPLORATION APPARATUS

Filed Nov. 5, 1951

Burton McCollum
INVENTOR.

BY Lewis H. Wilson
ATTORNEY

United States Patent Office 2,766,837
Patented Oct. 16, 1956

2,766,837
SEISMIC EXPLORATION APPARATUS
Burton McCollum, Houston, Tex.
Application November 5, 1951, Serial No. 254,910
11 Claims. (Cl. 181—0.5)

This invention relates to apparatus for exploring subsurface geology by means of the seismograph, and more particularly to a new and improved apparatus for generating seismic waves. More specifically the invention relates to such apparatus involving the utilization of the principle of detonating an explosive charge in the air above the surface of the earth.

The present invention is described hereinafter with reference to the accompanying drawings wherein.

Before describing the details of the instant invention, there will now be pointed out a number of difficulties encountered with conventional seismic prospecting techniques, which difficulties seriously limit the utility and accuracy of such techniques. These will be more readily understood by describing them with reference to Figure 1 of the drawings illustrating such techniques. In their essence, these customary techniques involve the use of a recording device 1 connected by wires 2 to a plurality of detectors 3. An explosive charge is fired in a shot hole 4. The elastic wave generated by the shot travels in all directions as indicated by the waves 5. Whenever these waves encounter boundaries characterized by material variations in density or elastic properties of the earth, a portion of the wave energy is reflected, the magnitude and direction of the propagation of such reflected waves being governed by well-known laws. In general, waves will be reflected from stratigraphic boundaries 6 and 7. The depth and contour of the strata can be determined by detecting and recording the travel times between the shot and the detector, provided the reflected events are sufficiently clear and definite. It is these relatively vertical components of the wave which are useful to the geophysicist in exploring subsurface stratigraphy.

Figure 1:
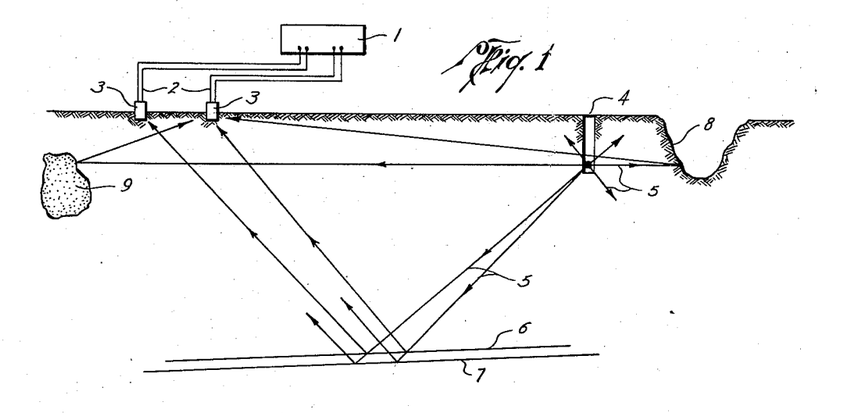
Figure 1 illustrates certain difficulties encountered in using conventional methods of seismic exploration.

One major difficulty characteristic of the above described conventional method results from the fact that reflections are derived not only from the vertically traveling waves 5, but those components traveling in a relatively horizontal direction also encounter reflecting boundaries such as 8 and 9. Boundaries 9 may be cause by local variations in physical properties resulting from the interbedding of sands, shales, clays, rocks, and the like. Boundaries 8 may be caused by sharp erosional or subsurface boundaries. Waves reflected from these boundaries travel in a relatively horizontal plane, and are often very numerous and of considerable magnitude as compared with the vertically traveling reflected waves. Such horizontally traveling waves frequently completely obscure the useful events reflected from the strata it is desired to explore.

In addition to the waves mentioned above, there usually appear on the record certain events generally referred to as stray events or noises, such events being caused by wind, traffic, or natural earth movements. These stray events often contribute in considerable degree to the difficulties in identifying the desirable reflected events on the record.

Even when the useful events are not entirely obscured, the interference of the several groups of waves produces distortions and phase displacements that confuse the geophysicists and often cause serious errors in interpretation.

Another serious limitation of the techniques generally used heretofore is attributable to the use of explosives in shot holes dug in the earth. When a charge of explosive is fired in the soft and unconsolidated formations near the surface of the earth (in which for economic reasons most shot holes terminate), the tremendous pressure of the shot far exceeds the elastic limit of the surrounding materials, resulting in pronounced disruptive effects which absorb and dissipate a large part of the energy of the shot. Further, it will be readily seen that when a charge of explosive is embedded in the earth below the surface, the energy that is radiated in the form of elastic waves goes in all directions from the shot as a center so that the generation of a large amount of horizontally traveling wave energy is inevitable.

According to the present invention the above described difficulties are minimized. The means by which these difficulties are minimized comprises employing means of generating seismic waves whereby the generation of horizontally traveling waves is markedly reduced. This new means of generating seismic waves also avoids entirely the disruptive effects above referred to, and has the further advantage that no shot holes are required, thereby greatly reducing the cost of field operations.

The principle of using an explosion in the air above the surface of the earth as a source of seismic waves is old, it being covered by my Reissue Patent No. 17,242, granted March 19, 1929. I have made an important and substantial improvement in this art of generating seismic waves by means of an atmospheric explosion, which improvement comprises one of the essential features of the present invention.

I have now developed a successful means of using as the explosive agent a mixture comprising atmospheric air and a hydrocarbon, thereby greatly reducing the expense, labor and inconvenience involved when employing commercial oxygen, explosives, and the like instead of the air.

Heretofore, numerous attempts have been made to utilize air-fuel mixtures as a source of seismic waves; but these have been unsuccessful because of certain well-known phenomena which now will be outlined. It is well-known that when a suitable mixture of hydrocarbon and air is subjected to very high pressure, as in the compression stroke of a high compression-ratio internal combustion engine, detonation readily occurs. It is also known that if the mixture is fired when subjected to only a relatively low compression, it will burn and under certain conditions explode, but will not detonate. This (only burning) always happens when the mixture is fired at atmospheric pressure. The mixture burns with what, at best, is a mild explosion and is entirely unsuited for producing a usable seismic wave. Likewise it is known that if a suitable mixture of air and hydrocarbon is confined (e. g. in a long tube) and ignited locally, the burning of the mixture in the vicinity of the spark will gradually develop a pressure on the as yet un-ignited portion of the mixture and this pressure may, under certain conditions, be built up to the point at which detonation of the balance of the mixture occurs. However, this is far from being adequate for use as a source of seismic waves, chiefly because of a certain phenomenon known as the induction period which is a time delay between the ignition of the mixture and the resulting explosion. Under the setup just outlined, this induction period will vary over a wide range, e. g. from about 20 to 100 milliseconds or greater, according to conditions difficult to control, which variations are many times larger than can be permitted in seismic exploration work.

While it is desirable to have a low induction period, the magnitude of the induction period is relatively insignificant as compared with the variation in the induction period in making a series of shots. The reason for this is that correction can be made for an induction period of undesirably large magnitude, provided the induction period is constant, whereas a similar correction cannot be made for variation in the induction period. In order to obtain satisfactory results in geophysical exploration, the induction period should not vary in excess of about one millisecond, and preferably for best results the variation will be substantially less than one millisecond.

I have found that these large variations in the induction period of air-hydrocarbon mixtures are due chiefly to three causes, namely: (1) variations in temperature of the mixture at the time of ignition; (2) variations in the percentages of the air and hydrocarbon components of the mixture; and (3) variations in the composition of the hydrocarbon itself. For example, if an ideal mixture of propane and air is ignited by a spark, the induction period will be of a certain value, depending on the other variables above mentioned. If now an ideal mixture of any other hydrocarbon, as for example when a small amount of any other hydrocarbon is mixed with the propane, the induction period will be greatly altered, even though all other conditions remain the same. In seismic exploration work it will be necessary for economic reasons to use hydrocarbons of commercial grade, and these grades vary greatly in composition at different times and places, depending on the quality of the crude supply and the refining techniques used. My experiments show that variations in the induction period, due chiefly to the above causes, are so great as to preclude the use of air-hydrocarbon mixtures in commercial seismic exploration, when the mixture is ignited by a spark, or by other means heretofore used.

I have found how the above mentioned difficulties can be substantially eliminated and have thus found a practical way of using an air-hydrocarbon mixture as the source of seismic waves for subsurface exploration. I have found that if, instead of a spark, the ignition is accomplished by a small amount of high explosive, such as a percussion cap or blasting cap, the induction period virtually disappears, even when encountering wide fluctuations in the variables (1), (2) and (3) listed hereinabove; and according to the present invention I obtain a substantially constant induction period the variation of which is not more than 0.1 of a millisecond. This is believed to be due chiefly to the fact that the percussion raises the pressure of the mixture immediately surrounding the ignition point to a pressure equal to or exceeding the critical pressure required for detonation and the detonation spreads almost instantly throughout the volume of the mixture. I have found that even more effective than a percussion cap is a small volume of a detonating mixture of oxygen and hydrocarbon (e. g. propane or other paraffin hydrocarbon), and for reasons set out hereinbelow I prefer to use such a mixture in lieu of a percussion cap. The amount of oxygen required for this purpose is so small that its cost is a minor item. The charge used for detonating the main charge is referred to herein as the initiator charge. While I prefer to use a mixture of oxygen and a hydrocarbon (and for economic reasons commercial grades of both are used) for the initiator charge, I may use any other detonating charge provided it effects detonation of the main charge without any appreciable variation in the induction period.

The hydrocarbons disclosed below may also be used in combination with oxygen to form a detonating mixture for the initiator charge. While I may use as a fuel for the main charge any fluid or mixture thereof which is capable of being detonated in a substantially unconfined condition, as opposed to merely burning, primarily for economic reasons I prefer to use an explosive mixture of gases comprising the hydrocarbon gases in combination with air. Of the hydrocarbon gases I prefer the alkanes (e. g. ethane, propane, butane) partly because they are cheaper and/or more readily available than other hydrocarbon gases such as the alkenes (e. g. ethylene, propylene, butylene). Further, they are safer to use than certain other hydrocarbon gases such as the alkynes (e. g. acetylene). In general, the use of butane is contemplated under high temperatures, propane where the temperatures are moderate, and ethane in extremely low temperatures. This is because the vapor pressures of these gases are closer to the values preferred under the temperature conditions indicated. I prefer to use mixtures of at least two of these hydrocarbons where necessary to hold the vapor pressure within the desired limit. Of course, excessive vapor pressures can be reduced to the desired extent by employing any of the usual types of pressure regulators.

The percentage composition of the charges is not critical, except that the initiator charge must be a detonator-type charge and the main charge must be at least an explosive-type charge capable of being detonated by the initiator charge or other means. Preferably the composition of the charges will be such as to give close approximation to substantially complete combustion without any appreciable excess therefor of any constituent. When using for the main charge a mixture of propane and air or butane and air, I specifically prefer about 4% propane and 96% air or about 3% butane and 97% air. When using propane and oxygen for the initiator charge, I specifically prefer about 17% propane and 83% oxygen. Desirably the amounts of said hydrocarbons in said charges will not vary in excess of about 25% of the percentages thereof given above, the remainder of the initiator charge being oxygen and the remainder of the main charge being air. All percentages are by volume.

Using the technique above described, it would be possible to detonate a mixture of air and hydrocarbon in the open air, provided there were no wind or convection currents (or eddy currents) to dissipate the mixture during the process of formation and prior to firing. However, this ideal situation rarely ever exists, so that as a practical matter it is necessary to shield the mixture against such elements. However, any shield that may be used must be virtually fully open to the atmosphere so as to permit the free expansion of the detonated gases, whereby the shock wave may be transmitted through the air to the earth, and so generate the seismic wave. Thus, one problem involved is that of creating a windshield which will effectively protect the mixture from too rapid dissipation and which at the same time will not confine the detonation gases to any material degree. Thus it is preferred that both the main charge (air-hydrocarbon mixture) and the initiator charge (oxygen-hydrocarbon mixture) be substantially shielded, i. e. so shielded as to substantially lessen dissipation thereof by winds, eddy currents, and the like and still permit rapid egress of the detonated charges into the open atmosphere.

Figure 2:
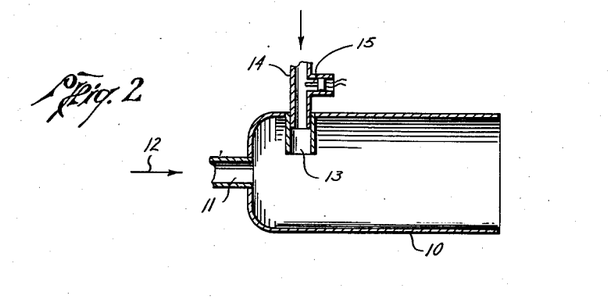
Figure 2 illustrates in elemental form the principle of my improved method of generating seismic waves according to the present invention.

Typical of the means whereby I accomplish the above objectives is the device shown in elemental form in Figure 2, which is a longitudinal section of a windshield and detonator. A windshield 10 is made of any strong material, e. g. steel, capable of withstanding pressures resulting from detonation of the explosive mixture, which mixture (for economic reasons) preferably should be some of the more common hydrocarbons of the paraffin series mixed with air in proper portions to approximate complete detonation. This mixture is injected into the windshield 10 through a port 11 therein as indicated symbolically by arrow 12. Preferably at about the same time a detonating mixture of gases, e. g. a mixture of oxygen and a hydrocarbon gas, is injected into a detonator chamber 13 through a port 14 in which is located an ignition device 15 which may be an ordinary spark plug. When the shield 10 and the detonating chamber 13 are filled with their respective mixtures, a spark through the spark plug 15 ignites the detonating mixture in the detonator chamber 13, which in turn detonates the main charge. This detonating charge, expanding freely into the atmosphere through the open end of the shield, sets up a shock wave in the air which is communicated into the ground as a seismic wave. Charges formed from an air-hydrocarbon mixture and charges formed from an oxygen-hydrocarbon mixture are referred to herein as "main charges" and "initiator charges," respectively. The detonator chamber 13 performs the same function in shielding the initiator charge as does the windshield 10 in shielding the main charge.

In a far more practical embodiment of the principle shown in Figure 2, it is important to introduce certain additional features to increase the effectiveness of the device. Below are given the reasons for the more important of these additional requirements.

It will readily be understood that if the air-hydrocarbon mixture is injected into the shield through a single port which is small compared to the area of the shield, as indicated in Figure 2, there would be a large degree of mixing with the air (or burned gases from the preceding charge) already in the shield, thereby diluting the mixture to an objectionable degree, so that the injection of the air-hydrocarbon mixture would have to be continued for a considerable time before the original contents of the shield would be flushed out. This is wasteful of both time and valuable fuel. Any embodiment of this device having the desired efficiency must be designed to minimize this intermingling as much as feasible. Another important consideration is that my experiments show that the detonation of the main charge is most effective if the detonating chamber 13 is located substantially concentric with the longitudinal axis of the shield, and designed and oriented so that it discharges radially in all directions and as far back as possible from the open end of the windshield, as shown in Figure 2.

Another factor relates to the size of the opening of the end of the windshield 10. As stated above, it is important to have a large opening in the discharge end of the windshield in order to permit free egress of the detonation wave into the atmosphere. However, it is usually desirable to compromise here in order to further minimize wind disturbances. When a high wind is blowing into the opening, and at a large angle with the axis of the shield, eddy currents are set up within the shield to a considerable depth, thereby diluting the mixture and reducing the effectiveness of the detonation. It is desirable, therefore, to develop a design that will minimize this intermingling as much as possible, while permitting adequate freedom of egress of the detonated charge into the atmosphere.

Another factor to be taken into account is the fact that, with the simple arrangement shown in Figure 2, there will be a violent recoil upon detonation of the explosive charge, which recoil can be avoided by using a twin arrangement discharging in opposite directions based on the well-known principle of the bazooka.

A further consideration is that immediately following a shot, both the shield and the igniter system will be filled with very hot gases which should be flushed out as rapidly as possible to prevent overheating of the equipment. This is especially true in the case of the igniter system, since the temperature resulting from the explosion of the hydrocarbon with commercially pure oxygen is extremely high.

Figure 3:
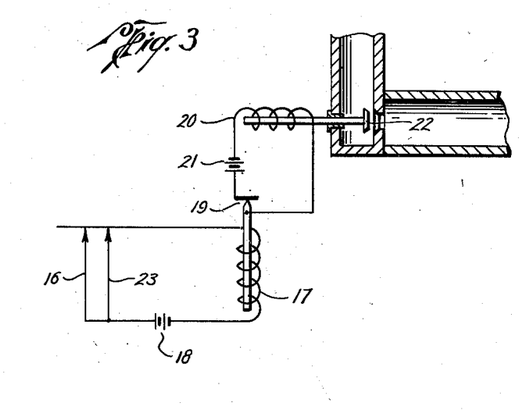
Figure 3 shows in principle one type of control mechanism well suited for carrying out my new method of generating seismic waves.

It is also very desirable to provide remote control valves for controlling the flow of gases regardless of whether manual or automatic operations are employed, this being desirable in all cases and necessary when this method of generating seismic waves is used in combination with my integrating recorder disclosed in my copending application Serial No. 195,377, filed November 13, 1950, and entitled "Seismic Exploration Apparatus." In considering the type of valve control to use, it is necessary to bear in mind that each valve will always be in either a completely open or completely closed position. Quick-acting, plunger type valves are preferred. Any control mechanism must have for its object to open (or close) a valve, hold it in that position for the required length of time, and then close (or open) it. For such an operation one of the simplest devices is a solenoid-operated valve, which is actuated by a two-position step-switch, the latter being actuated by a simple electrical contact. Numerous well-known types of such equipment are commercially available, but for clarity of such explanations there is given here a brief description of the basic principle of a preferred type of such valves. Referring to Figure 3, a contact device 16 controls the position of a solenoid-type step-switch 17. When the contact 16 is closed, it actuates the step-switch 17 by energizing its solenoid through a battery 18 and sets the step-switch in one of its two possible positions. In this position, as here shown, contact 19 is closed, thereby energizing solenoid 20 through a battery 21 and opening a valve 22. The valve 22 remains in this position until the step-switch 17 is thrown to its alternate position by again being energized, either by the contact device 16 or some other contact 23, which is encountered at an appropriate position in the revolution of a recorder drum 78 of my integrating recorder, or similar apparatus.

Figure 4:
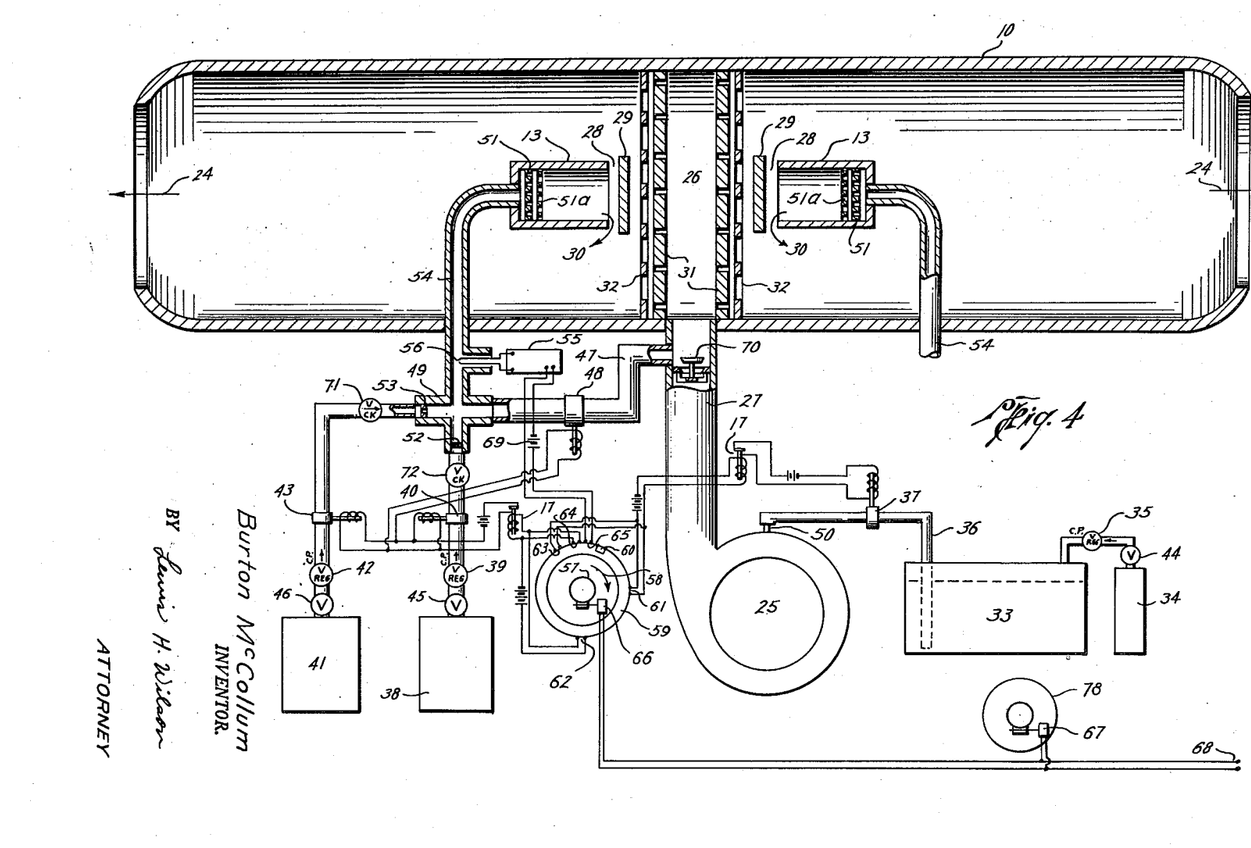
Figure 4 shows in complete form a preferred and highly practical embodiment of my means of generating seismic waves.
Figure 5:
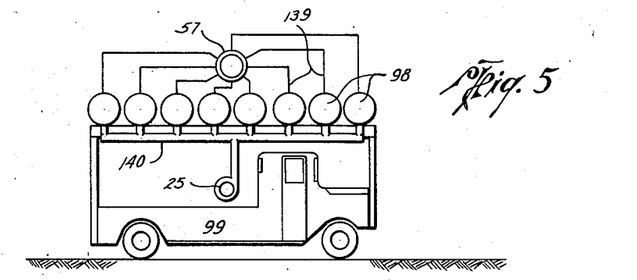
Figure 5 illustrates a specifically preferred way of practicing my new means of generating seismic waves.
Figure 6:
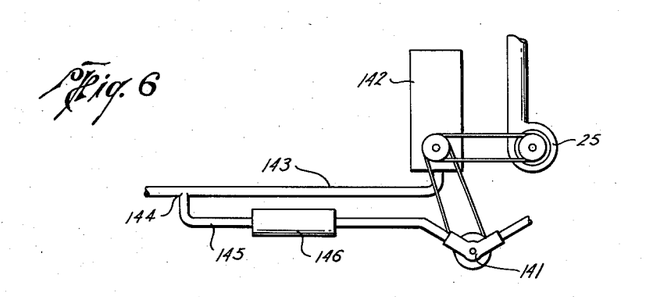
Figure 6 shows an alternative embodiment of my means of generating seismic waves.

Bearing in mind the considerations described above, now will be given a description of one quite practical and preferred embodiment of my invention and its mode of operation. Referring to Figure 4, the windshield 10 is here shown in a twin embodiment designed to take in its fuel charge in the center and to discharge (arrows 24) at the two open ends. An air-moving device, which may be a compressor but preferably is a pressure blower 25, is driven by any suitable source of power (not shown) and is connected to a central chamber 26 by a duct 27. In a preferred design the detonating chambers 13 are situated approximately concentric with the longitudinal axis of the shield and are designed to discharge their contents through a circular gap 28 between the chambers 13 and barrier plates 29 in a radial direction near a perforated plate 32, the discharge being represented symbolically by arrows 30. Two pairs of perforated plates 31 and 32, the functions of which will be described below, are located on either side of the center of the windshield 10 and embrace the central chamber 26 between them. Although both detonating chambers 13 are coupled externally to identical assemblies, hereinafter only one of these assemblies will be shown and described for the sake of greater clarity.

If the blower 25 is running continuously at constant speed, there will be a stream of air flowing through the duct 27 into the central chamber 26 in which there will be built up a certain pressure, depending on the power of the blower. For reasons more fully set out later in this specification, I prefer to use a pressure equal to the weight of a column of water at least several inches high. One object in this respect is to maintain a blower pressure sufficiently greater than any wind pressure normally encountered, so that the pressure differential between that of the blower and that of any wind blowing into one end of the windshield will be so great that the wind's effect on the difference in rate of filling the two halves of the windshield with fuel will be insignificant. This steady pressure will cause a continuous flow of air through the perforations in the plates 31 and 32, this air passing out through the open ends of the shield. This represents one factor in the steady state necessary for proper initiation of the shooting cycle. Other factors of this necessary steady state are given in the following paragraph.

A fuel tank 33 is stocked with a hydrocarbon, preferably a volatile hydrocarbon having a vapor pressure at working temperatures greater than atmospheric pressure so that any fuel released therefrom will evaporate with great rapidity. Such hydrocarbons as butane and propane, e. g., are preferred for this purpose. An auxiliary tank 34 containing a gas, preferably an inert gas such as e. g. carbon dioxide or nitrogen, at a pressure in excess of the vapor pressure of the fuel in the fuel tank 33, is connected to the top of the tank 33 through an automatic pressure regulator 35, which can be set to hold any desired constant pressure on the tank 33. A discharge pipe in the form of a siphon tube 36 extends almost to the bottom of the fuel tank 33 so that only liquid fuel will be discharged from the tank when valve 37 is opened at the beginning of the shooting cycle. Another tank 38 contains a volatile hydrocarbon, preferably one having a vapor pressure at the working temperature considerably in excess of atmospheric pressure. Numerous gases may be used but henceforth in this specification the gas in the tank 38 will be referred to as propane, which is one of the most satisfactory for this use. The tank 38 is connected through an automatic pressure regulator 39 to a valve 40 so that a constant pressure is held at the valve. Another tank 41 contains oxygen, preferably of commercial purity, and, for the sake of convenience and economy, this tank should be such as is commonly used to supply oxygen gas in commerce. This tank is connected through a pressure regulator 42 to a valve 43 at which a constant pressure is held.

The conditions described in the three paragraphs immediately above embrace the most important conditions precedent to the initiation of the shooting cycle. There will now be described the sequence of the shooting cycle, and for greater clarity this will first be described on the presumption that all valves are manually operated.

To initiate the shooting cycle, the blower 25 is started and three hand valves 44, 45 and 46 are opened. The automatic pressure regulators 35, 39 and 42, having previously been properly adjusted, immediately establish the desired pressure in the lines to which they are connected. The blower drives a continuous stream of air through the duct 27 into the central chamber 26, and it will be noted that some of the air will be by-passed through duct 47, valve 48 being open during the early part of the cycle. This serves to push out the residual gases from cross 49 and the detonating chambers 13. The first operation of the shooting cycle is to open the valve 37, which permits a definite rate of fuel to flow under the constant pressure through a choke 50 into the blower 25. The pressure on the fuel tank 33, the size of the choke, and the blower speed are adjusted once for all so that an ideal explosive mixture is assured. Because of the high natural vapor pressure of this fuel (butane), it evaporates very rapidly and is thoroughly mixed with the air in the blower and the duct 27 through which it is discharged into the chamber 26. By the time the mixture reaches the chamber 26, the fuel is so completely mixed with the air as to be potentially explosive. This condition of flow is continued until the entire windshield 10 is completely filled with a potentially explosive mixture.

This is an appropriate time to digress to explain one of the chief purposes of the perforated plates 31 and 32. It will readily be seen that if these plates were not present, the explosive mixture entering the shield through the duct 27 would to a large degree become intermingled with the air (or residual gases following a shot) already in the shield, and this intermingling would so dilute a considerable part of the mixture that it would become non-explosive. It would, therefore, be necessary to cause the explosive mixture to flow into the shield for a prolonged period until virtually all the improperly mixed gases were flushed out of the shield. This would be very wasteful of time and fuel. By inserting the plates 31, having a large number of small holes distributed over their surface, the entry of the explosive mixture into the windshield is more uniformly distributed over the cross-section of the windshield and is, therefore, in a better position to drive the improperly mixed gases ahead with much less intermingling. However, since the gas mixture flows through the small holes with considerable velocity, and since the combined area of these holes is small compared to the cross-section of the windshield, there will still be objectionable intermingling and waste. This is largely eliminated by inserting the plates 32, each of which has approximately the same number of holes as plates 31, but the holes in plates 32 are much larger so that their aggregate area is almost as large as the cross-section of the shield. It is preferred that these plates 31 and 32 be placed so that none of the holes in one is opposite to any hole in the other, but so that all of the small holes in plates 31 will be opposite a portion of the web of plates 32. In this way the high velocity of the gases in the small jets from the holes in the plates 31 is destroyed, the gas is deflected at right angles parallel to the surface of the plates, and finally emerges at low velocity through the large openings in the plates 32. It is now distributed over almost the entire cross-section of the windshield and drives the improperly mixed gases ahead with very little intermingling and waste. The perforated plates 51 and 51a in the detonating chambers 13 serve substantially the same purpose.

Next the description of the shooting cycle will be continued. Having established a flow of an explosive mixture into the windshield 10 by opening the valve 37, this flow is maintained until the entire windshield is filled with the explosive mixture, whereupon the valve 37 is closed to shut off the fuel. The blower continues to run so that pure air drives the explosive mixture through and out of the duct 27. However, while the explosive mixture is still flowing into the windshield, and usually at approximately the middle of this period of flow, the flush-out valve 48 is closed and the valves 40 and 43 are opened. This permits the flow of both propane and oxygen into the cross 49 through chokes 52 and 53, which are so designed in relation to the settings of the automatic pressure regulators 39 and 42 that an ideal detonating mixture is formed by the mixing of the two gases in the cross 49 and in flow line 54 leading therefrom. This flow of oxygen and propane is continued until the detonating chambers 13 are filled with the detonating mixture. The various pressures and chokes are so adjusted once for all that the detonating chambers are filled with the detonating mixture about the time the boundary between the explosive mixture and air from the blower arrives approximately at the point the duct 27 enters the chamber 26. At this instant the detonating mixture in the line 54 is fired by energizing a spark coil 55, which is connected to a spark plug 56. The fire travels with detonating velocity, and therefore with negligible time delay, through the line 54 and detonates the initiator charges in the detonating chambers 13 which, in turn, detonates the main fuel charge (air-butane mixture) throughout the volume of the windshield 10. Almost instantly after firing the charge, the valves 40 and 43 are closed, thereby shutting off the propane and oxygen feed, and at essentially the same instant the valve 48 is opened so that air from the blower blows through the duct 47 and quickly flushes the hot residual gases out of the detonator system into the windshield. The fuel previously having been shut off, as described above, the blower continues to operate and quickly blows all residual gases out of the windshield. The entire system is now filled with atmospheric air and everything is in readiness for a repetition of the cycle.

In the above description of the operation of the shooting cycle, it was assumed, for greater simplicity and clarity, that the valves were manually operated. Next the shooting cycle will be described with reference to employing automatically controlled valves, which type valves are preferred over hand valves and necessary when using this method of generating seismic waves in combination with my integrating recorder.

Referring to Figure 4, numeral 57 designates a disk or drum rotatable about an axis, as indicated by arrow 58. Mounted on this drum is an insulating ring 59 on which is mounted a conducting segment or contact bar 60. Mounted at suitable angular intervals around the drum 57 are five pairs of electrical contact terminals or fingers 61, 62, 63, 64 and 65. These contact terminals press upon the circuits of the insulating ring 59, and each pair is short-circuited in turn by the contact bar 60 as it rotates. As will be seen, these several pairs of contact terminals are connected by wires to the several valve assemblies 37, 40, 43 and 48, and one pair 65 is connected to the spark coil 55. It is to be understood that each of the illustrated valve assemblies, such as 37, for example, is a symbolic representation of the automatically controlled step-switch and solenoid valve illustrated in Figure 3, including batteries. The rotating drum 57 may be mounted on the recorder drum 78 of my integrating recorder but I prefer that it be a separate drum. In the arrangement shown in Figure 4 the drum 57 is electrically coupled to the recorder drum 78 in such manner that the two drums always maintain the same speed and phase relationship. One simple way of accomplishing this is to drive the drums by synchronous motors 66 and 67, respectively, and couple these two motors to a common source of alternating current 68 of constant frequency. The chief reason for separating the drums 78 and 57 is that while the recorder drum 78 must be on the recording truck, it is highly desirable to have the control drum 57 mounted on the truck carrying the shooting equipment.

Starting at the beginning of the shooting cycle (the control drum 57 and the recorder drum 78 being synchronously rotated at constant speed), at which time the contact bar 60 has just passed the contact terminals 65, this cycle may be described as follows: By referring back to the description of the manually operated cycle, it will be seen that when the contact bar 60 is in the position stated above, the main fuel valve 37, the propane valve 40 and the oxygen valve 43 are all closed, while the flush-out valve 48 is open, permitting air to flow from the duct 27 through the line 54 and the detonating chambers 13. During this interval, therefore, the entire system, including both the shield 10 and the detonating chambers 13, is flushed out with air from the blower 25, and by the time the contact bar 60 reaches the contact terminals 61 this flushing-out process will be complete, and only pure air will be in any part of the system. When the contact bar 60 passes under the pair of contact terminals 61, the effect is the same as closing the contact 16 in Figure 3. This opens the valve 37 of Figure 4, thereby permitting fuel to flow from the tank 33 through the flow-limiting choke 50 into the blower 25 where it is thoroughly mixed with air and the resulting explosive mixture is carried to the shield 10, most of it by way of the chamber 26 but a part by way of the detonating chambers 13. As will be understood from the description given above with reference to Figure 3, the fuel will continue to flow until shut off by the contact bar 60 passing under the contact terminals 63, which throws the two-position step-switch 17 into its alternate position, thereby closing the fuel valve 37. However, before this occurs, the contact bar 60 will have passed under the contact terminals 62, thereby closing the circuits leading to the valves 40, 43 and 48. This opens both the oxygen and propane valves 40 and 43 and permits the detonating mixture of oxygen and propane to fill the detonating chambers 13 and at the same time closes the valve 48 and thus stops the flow of gases through the line 47 which otherwise would dilute the detonating mixture unfavorably. As the contact bar 60 passes under the contact terminals 63, the fuel valve 37 is closed, after which only pure air passes through the blower and drives the explosive mixture out of the duct 27. The angular spacing between the contact terminals 63 and 64 is such that at about the time the explosive mixture is driven out of the duct 27 into the space 26, the contact bar 60 passes under the contact terminals 64 and closes both the propane valve 40 and the oxygen valve 43, and also opens the flush-out valve 48. An instant later the contact bar passes under the contact terminals 65, thereby energizing the spark coil 55 through a source of electricity 69, thus firing the spark plug 56 and exploding the detonating mixture in the line 54 and substantially simultaneously transmitting the detonating wave to the detonating chambers 13, which, as previously explained, detonates the entire charge inside the shield 10.

In determining the angular spacing between the pairs of contact terminals 64 and 65, it will be noted that this angle must be small enough so that the spark plug 56 will be fired before pure air flowing through the line 47 can drive the detonating mixture out of the cross 49 and past the spark plug 56, since otherwise the charge would not be fired. In practice, this interval between the opening of the flush-out valve 48 and the firing of the spark usually will not be more than a few thousandths of a second.

In the above description, the two drums 78 and 57 are shown held in synchronism by coupling the synchronous motors 66 and 67 by the circuit 68, but this is not a limitation. The synchronism may be maintained in a variety of ways through the medium of wires, or entirely without wires by radio signaling, using principles too well known to electrical technicians to require description here.

The particular arrangement shown above for actuating the valves in proper sequence, by causing the contact bar 60 to short-circuit the several contact terminals in proper order, is only one of numerous possible arrangements that may be used for this purpose. For instance, cams may be used to operate the electrical contacts, as is done in the case of automobile ignition, or numerous other devices well-known to those skilled in the art may be used.

In the above description of the operating cycle, there was given one reason for the use of the perforated plates 31 of Figure 4. There is another important reason for the use of these plates having small perforations. Since, as explained above, the twin windshield 10 must be open at both ends, in order to give balanced recoil, it will be evident that if no barrier is presented across the section of the windshield, wind blowing into one end would drive the explosive mixture out through the other end as fast as it is injected from the duct 27. In other words, the windshield would be effective only against a wind blowing almost exactly at right angles to the longitudinal axis of the windshield. If, however, the barrier plates 31 are placed across the entire section of the windshield and these plates perforated with a number of holes (the size and number of which is determined so that the pressure of the blower required to drive the necessary amount of air through the perforations is high compared to the static pressure of the wind), then the flow of air will be virtually unaffected by the winds and the mixture will flow about equally into both compartments of the windshield, substantially as though no wind existed. This is an important element in my invention. It may take a variety of forms, all of them, however, involving the basic principle of employing a blower pressure that is high in comparison with the pressure of ordinary winds, and introducing a choke or chokes into the flow stream of such design that said chokes absorb a large part of the pressure delivered by the blower. In the case of winds usually encountered in field operations, the wind pressures may range up to about one-half inch of water. In order that this pressure may not seriously affect the flow of gases in the windshield, the pressure drop across the above mentioned chokes must be at least about three inches of water; I prefer to use a pressure drop of about nine inches of water.

In the foregoing description, it was mentioned that the pressure of the inert gas to be maintained on the fuel tank 33 should be higher than the natural vapor pressure of the fuel. This is important for the following reason. As stated above, it is desirable to use a fuel of very high vapor pressure in order that it will evaporate quickly on being injected into the air stream from the blower. I have found that butane and propane are particularly well adapted for this purpose. It will be seen that it is important to hold a practically constant pressure on the choke 50 in order that a substantially uniform mixture of fuel and air may be assured. If the natural vapor pressure of the fuel is relied upon to drive the fuel supply through the choke 50, the quantity of the fuel supplied will vary greatly with the temperature in the tank 33, unless an automatic pressure regulator is placed in the fuel flow line 36. However, a pressure regulator placed in this position is subject to freezing because of absorption of heat resulting from the loss of heat from the fuel as it passes through the valve of the regulator, and this is a constant source of trouble. However, by maintaining an excessive pressure on the tank 33, as set out above, there is no need for a regulator in the fuel flow line, and there is no loss of pressure, and therefore no cooling until the fuel emerges from the choke 50. Thus the only cooling that takes place is in the open air, which does no harm. This device has proven very successful in avoiding the freezing troubles that are so commonly encountered when attempts are made to take fuel at high rates of flow from tanks containing liquefied petroleum gases.

The assembly shown in Figure 4 operates remarkably well as long as no abnormal conditions develop that might cause premature ignition. In the above description it is explained that normal ignition does not occur until the explosive mixture has been swept out of the duct 27. If, however, abnormal conditions are encountered such that would effect ignition earlier than this, there is a possibility of backfire into the duct 27 and the blower 25, which might cause damage to equipment. In order to guard against this possibility, I use a check valve 70. For a similar reason, I prefer to employ check valves 71 and 72 in the lines supplying propane and oxygen to the cross 49. Standard type check valves are available for this purpose.

In the foregoing description there is shown as a source of seismic waves, only a single twin arrangement of windshields 10 (Figure 4) as a shooting unit. In practice, I prefer to use a plurality of such units disposed as shown in Figure 5. A plurality of such units 98, mounted on a vehicle 99, are all controlled by the single control drum

57 in the same manner as shown with reference to Figure 4 hereinbefore. Multiple electric circuits 139 extend from the control drum 57 to operate the various valve assemblies in the same manner as explained with reference to Figure 4. The single blower 25 supplies the air-hydrocarbon mixture to all of the shooting units 98 through a manifold 140. This distribution of the units in a plane gives rise to an approximation to a plane wave striking the earth's surface, which is desirable in any method involving placing of shots in the air above the earth. This arrangement also accomplishes the very desirable objective of distributing the impact over a large area, so that, for a given total impact, the pressure at any point on the earth is a minimum, thereby avoiding any stressing of the surface soils beyond their elastic limit. By this means the efficiency of utilization of explosive materials is greatly enhanced, and the quality of the result is improved. In order to secure to a maximum degree the approximation to a plane wave striking the surface of the earth, and to distribute the pressure uniformly over a large surface so as to attain a minimum unit pressure at all points, I prefer to place the windshields 10 in which the detonation wave is generated as high as practicable above the ground. The limit to which this can be carried is determined by permissible top-heaviness of the equipment and by clearances of existing highway underpasses. Because of these limitations, I usually place the windshields about ten to twelve feet above the ground.

In the above description with reference to Figure 4, there is shown a pressure tank 34 containing an inert gas (carbon dioxide or nitrogen), which tank is coupled to the fuel tank 33 through the automatic pressure regulator 35 for the purpose of maintaining on the fuel tank 33 a pressure in excess of the vapor pressure of the fuel in said tank 33. This arrangement operates very successfully and is quite satisfactory. However, the compressed gases are expensive and the tanks required to contain these gases are very heavy so that the task of handling is considerable. I can avoid these undesirable features by employing the arrangement shown in Figure 6 instead of the compressed gas just mentioned. In Figure 6 a small compressor 141 is driven by an internal combustion motor 142 and used to compress the exhaust gases from this motor 142. When these gases are compressed they are stored in the tank 34 and utilized for the same purpose as the nitrogen or carbon dioxide, as explained above with reference to Figure 4. Preferably this same motor (142) is used simultaneously for driving the blower 25 (Figure 4). Since the exhaust gases from the motor are entirely inert and consist chiefly of nitrogen and carbon dioxide, they are quite satisfactory for this purpose. In practice I use the arrangement shown in Figure 6 for cooling the exhaust gases prior to compression. Numeral 143 represents an exhaust pipe. Since I require for my purposes only a small fraction of the exhaust gases discharged from the motor 142, I tap the exhaust pipe 143 at a point 144 which is preferably near the open end of the exhaust pipe. From this point another pipe 145 leads to a heat exchanger manifold 146 which cools the gases before they are drawn into the compressor 141. This arrangement assures a continuous supply of inert gas under the required pressure at practically no expense.

In the foregoing description with reference to Figure 4, the proper timing of the essential sequences of the shooting cycle was assured by the use of two drums, one of these being the recorder drum 78 on the truck carrying the recorder equipment and the other of these drums 57 being on the truck 99 carrying the shooting equipment, the two drums being synchronously driven by means of electric motors. Many other means, well known to electrical technicians, may be used to maintain the two drums in synchronism, either through the medium of wires or radio signals. It is entirely practical to operate in this manner, but I prefer to use the method outlined in principle with reference to Figure 7, as I have found this method to be simpler and of even greater dependability in operation. As hereinabove explained with reference to Figure 4, a shot is to be taken once each revolution (or a submultiple thereof) of the recorder drum 78 and if the successive records are to be integrated, all of the shots must be fired when the recorder drum is in substantially the same angular position. Since, in general, the shooting truck will be some distance away from the recorder truck, I arrange to transmit an electrical signal from the recorder truck to the shooting truck at practically the exact instant when the recorder drum 78 is in the proper angular position for a shot. This signal may be sent over wires or by radio, but the latter has certain advantages. The description given below relates to radio transmission of this signal.

Figure 7:
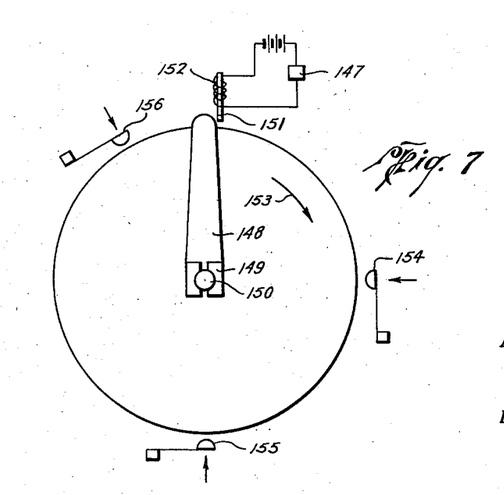
Figure 7 shows an additional alternative embodiment of my means of generating seismic waves.

Referring now to Figure 7, a radio-receiving device 147 picks up the shot signal transmitted from the recording truck, at the instant when the recorder drum 78 is in the proper position for the shot to be fired, and this signal is used in any of numerous well-known ways to trigger the firing of the shot. The radio signal is also used for triggering certain other operations, as described below.

Numeral 148 (Figure 7) represents an arm coupled through a friction clutch 149 to a shaft 150. The shaft 150 rotates at substantially constant speed and preferably is driven by an electric motor (not shown). The friction clutch 149 causes the arm 148 to rotate at the same speed as the shaft 150, unless the arm 148 is stopped by some positive braking action. While the speed of the shaft 150 need not be constant, its mean speed must be somewhat greater than the speed of the recorder drum 78, or a submultiple thereof, corresponding to the shooting cycle in use. The position of the arm 148 shown in Figure 7 may be regarded as the beginning of the shooting cycle. In this position the movement of the arm 148 has been stopped by at latch 151, and the friction clutch 149 is slipping while the shaft 150 continues to rotate. In this position the various valves shown in Figure 4 are in proper position for the shot to be fired. While the arm 148 is still being held stalled by the latch 151, the shot signal from the recorder truck is received either by wires or by radio communication and the shot is fired. The same impulse which fires the shot (or some other impulse derived therefrom may be used) actuates a solenoid 152 which withdraws the latch 151 and permits the arm 148 to rotate the shaft 150. At substantially the same instant that the latch is withdrawn, the oxygen and the propane valves 40 and 43 are closed and the flush-out valve 48 is opened (Figure 4), these operations also being triggered by the radio shot signal, either directly or indirectly, in any of many well-known ways as by actuating suitable relays. The arm 148 now moves around as indicated by arrow 153 until it reaches a cam 154 which actuates an electric circuit that opens the fuel valve 37 after the same manner described in Figure 4. As the arm 148 progresses, it actuates a second cam 155 which opens the oxygen and propane valves 40 and 43 and closes the flush-out valve 148. When the arm 148 reaches a third cam 156 it closes the fuel valve 37 then progresses to the starting point, where it is blocked by the latch 151 and held there until released by the incoming of the next shot signal. Since, as explained above, the speed of the shaft 150 is slightly greater than that of the recording drum 78 (or the submultiple of said speed in use), the arm 148 always arrives at the latch 151 before time for next shot. As before, the shot signal releases the latch and triggers the closing of the valves 40 and 43 and the opening of the valve 48, and all is in readiness for a repetition of the shooting cycle.

Figure 8:
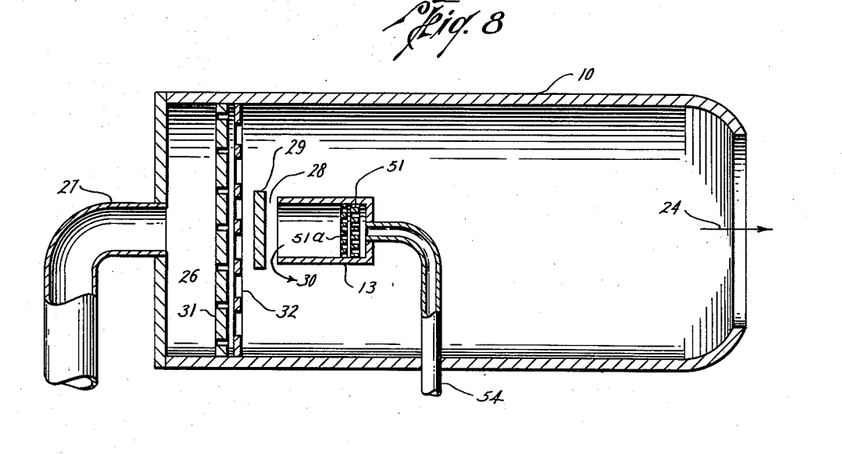
Figure 8 shows a modified form of the embodiment illustrated in Figure 4.

Figure 4 shows a twin windshield 10, and, for reasons stated above, I prefer to use this type windshield. However, a single windshield, e. g. as illustrated in Figure 8, may be used. By comparing the assembly of Figure 8 with that of Figure 4, the construction and operation of the former will be readily understood. The explosive mixture for the main charge is delivered by the blower 25 through the duct 27 into the central chamber 26 at the rear and closed end of the single windshield 10. Then in filling the windshield, the mixture passes through the perforated plates 31 and 32, as in Figure 4. The same method and means of forming the initiator charge in the detonator chamber 13 as used in Figure 4, is used here. Of course, I may use any desired number of such single windshields and various arrangements of a plurality of same.

Since many apparently widely different embodiments of this invention may be made without departing from the spirit and scope thereof, it is to be understood that the invention is not limited to any of the specific embodiments thereof except as defined in the appended claims.

What is claimed is:

1. Apparatus for generating seismic waves by detonating a gaseous mixture, which comprises containers for storing the component gases, an open-ended windshield for receiving a main charge, means for mixing the component gases of the main charge and conveying same into the windshield, at least one open-ended detonator chamber for receiving an initiator charge and adapted to discharge into and detonate the main charge, conduits forming a passageway from the storage containers to the detonator chamber, separate means positioned inside the windshield and detonator chamber in the path of flow of the mixtures of gases for the main charge and initiator charge, respectively, whereby said mixtures fill the same and simultaneously expel therefrom air and other undesirable gases with minimum intermingling of said mixtures therewith, means for controlling the flow of the gaseous components of said mixtures, and means for firing the initiator charge.

2. Apparatus for generating seismic waves by the detonation of an air and gaseous mixture, which comprises separate containers for storing hydrocarbons and oxygen, an elongated windshield open at both ends for receiving the main charges and lessening the dissipation thereof by winds and eddy currents, means for mixing air and a paraffin hydrocarbon and then conveying same into the windshield at a point about midway between its two ends, a detonator chamber having one end open and adapted to discharge into each half of the windshield, conduits for conveying oxygen and a paraffin hydrocarbon into said detonator chambers through the closed end thereof, separate means including a pair of perforated disks attached to the inside walls of the windshield on both sides of said midpoint and at least one perforated disk similarly attached inside the detonator chambers near the closed end thereof, in the path of the mixture of gases for the main charges and the initiator charges, respectively, whereby said mixtures uniformly fill the windshield and detonator chambers and simultaneously expel therefrom air and other undesirable gases with minimum intermingling of said mixtures therewith, means for controlling the flow of the gaseous components of said mixtures, and means for firing the detonator charges simultaneously.

3. Apparatus of claim 2, wherein the pair of perforated disks on each side of said midway point of the windshield includes an inside disk having a plurality of small perforations and an outside disk having a plurality of larger perforations which are staggered with respect to the perforations in the inside disk, and wherein the detonator chambers are located approximately on the longitudinal axis of the windshield near its center, the open end of the detonator chambers facing toward said perforated disks, and wherein a baffle plate is provided between the open end of said detonator chambers and outside disk.

4. Apparatus for generating seismic waves by detonating a gaseous mixture containing air, which comprises separate containers for storing hydrocarbons and oxygen, an elongated windshield open at both ends for receiving main charges and lessening the dissipation thereof by winds and eddy currents, means for mixing air and a hydrocarbon and then conveying same into the windshield at a point about midway between its two ends, a detonator chamber having one end open and positioned in each half of the windshield, conduits for conveying an initiator charge of oxygen and a hydrocarbon into said detonator chambers through the closed end thereof, separate means including perforated disks attached to the inside walls of the windshield on both sides of said midpoint and other perforated disks similarly attached inside the detonator chambers near the closed end thereof in the path of the mixture of gases for the main charges and the initiator charges, respectively, whereby said mixtures uniformly fill the windshield and initiator chambers and simultaneously expel therefrom air and other undesirable gases with minimum intermingling of said mixtures therewith, a series of automatic valves and pressure regulators for controlling the flow of the gaseous components of said mixtures, and means for firing the initiator charges including a spark coil and spark plug.

5. Apparatus for generating seismic waves by detonating a gaseous mixture containing air, which comprises separate containers for storing hydrocarbons and oxygen, a curved windshield open to the atmosphere for receiving a main charge and lessening the dissipation thereof by winds and eddy currents, means for mixing air and a hydrocarbon and then conveying same into the windshield, a detonator chamber having one end open and positioned in relation to the windshield so as to discharge its contents therein, conduits for conveying an initiator charge of oxygen and hydrocarbon into said detonator chamber through the closed end thereof, separate means, including perforated disks attached to the inside walls of the windshield and other perforated disks similarly attached inside the detonator chamber near the closed end thereof in the path of the mixture of gases of the main charge and the initiator charge, respectively, the flow thereby being uniformly distributed over the cross section of the windshield and initiator chamber so as to simultaneously expel therefrom air and other undesirable gases with minimum intermingling of said mixtures therewith, means for controlling the flow of the gaseous components of said charges, and means for firing the initiator charge, both said flow control means and said firing means being automatically actuated from a remote point by an electrical signal whereby the steps of forming and the steps of firing the charges are carried out at the desired predetermined times and in the proper sequence.

6. Apparatus for generating seismic waves by detonating a gaseous mixture containing air, which comprises means for storing oxygen and a hydrocarbon gas, a windshield forming an open ended chamber for receiving a main charge, means for mixing air and a hydrocarbon and conveying same into the windshield, a detonator chamber having one end open and located within the windshield, conduits for conveying an initiator charge of oxygen and hydrocarbon into said detonator chamber, separate means, including perforated disks secured inside the windshield and other perforated disks secured inside the detonator chamber, in the path of the mixture of gases of the main charge and the initiator charge, respectively, means for controlling the flow of said gases, means for firing the initiator charge, both the flow-control means and said firing means being automatically actuated from a remote point by an electrical signal, a rotating drum situated at said remote point and adapted to send out an electrical signal at a definite point in its rotation, a rotatable arm driven by a shaft through a friction clutch, the shaft being driven at a speed in excess of the speed of the rotating drum, a latching device adapted to stop the rotation of said arm at a definite point in its rotation, electro-responsive means actuated by said electrical signal adapted to release the latching device to permit rotation of the arm, means whereby said electrical signal fires said initiator charge substantially simultaneously with the release of the latching device, means whereby said rotatable arm actuates control devices at suitable angular positions in its rotation for actuating said flow-control means at the proper positions in the operating cycle.

7. An apparatus for generating seismic waves by detonating an explosive mixture of gases, which comprises separate containers for storing hydrocarbons and oxygen, a windshield open to the atmosphere for receiving main charges and lessening the dissipation thereof by winds and eddy currents, a motor-driven pressure blower for mixing air and hydrocarbon and then conveying same through a conduit into the windshield, detonator chambers having one end open and positioned in relation to the windshield so as to discharge their contents therein, conduits for conveying an initiator charge of oxygen and hydrocarbon into said detonator chambers through the closed ends thereof, separate means including a pair of perforated disks attached to the inside walls of the windshield and a pair of perforated disks similarly attached inside the detonator chambers near the closed end thereof in the path of the mixture of gases for the main charges and the initiator charges, respectively, whereby said mixtures uniformly fill the windshield and initiator chambers and simultaneously expel therefrom air and other undesirable gases with minimum intermingling of said mixtures therewith, means for controlling the gaseous components of said charges, and means for firing the initiator charges simultaneously.

8. Apparatus of claim 7, wherein means is provided for maintaining the pressure in the hydrocarbon container for the main charge above the vapor pressure of the hydrocarbon therein, which comprises an auxiliary container charged with an inert gas under pressure, a conduit having an automatic pressure regulator therein and forming a passageway between said auxiliary container and said hydrocarbon container.

9. Apparatus of claim 7, wherein means is provided for maintaining a pressure in the hydrocarbon container for the main charge above the vapor pressure of the hydrocarbon therein by utilizing the exhaust gases from an internal combustion motor, which comprises an exhaust pipe attached to said motor leading to a heat exchanger for cooling the exhaust gases prior to use, a compressor, an auxiliary container, conduits joining the heat exchanger with the compresser and auxiliary container and said hydrocarbon container, the conduit between the auxiliary container and said hydrocarbon container having an automatic pressure regulator therein.

10. Apparatus for generating seismic waves by detonating an explosive gaseous mixture, comprising a windshield open at opposite ends and forming a main chamber therebetween, a housing within said main chamber forming a partially enclosed detonator chamber, main supply means for supplying atmospheric air to said main chamber at a pressure above atmospheric, fuel supply means for mixing fuel with said main air supply to furnish an explosive mixture to said main chamber, means for supplying a detonating mixture of gases to said detonator chamber, and means for firing said detonating mixture to detonate said explosive mixture in said main chamber.

11. Apparatus for generating seismic waves by detonating an explosive gaseous mixture including atmospheric air, comprising a cylindrical windshield forming a partially enclosed main chamber open at at least one end, a housing within said main chamber for forming a partially enclosed detonator chamber, main supply means for supplying atmospheric air to said main chamber at a pressure above atmospheric, secondary supply means for supplying atmospheric air to said detonator chamber also at a pressure above atmospheric, diffusing means within said main chamber in the path of flow from said main supply means, diffusing means in said detonator chamber in the path of flow from said secondary supply means, fuel supply means for mixing fuel with said main air supply to furnish an explosive mixture to said main chamber, means for interrupting the flow of air to said detonator chamber and to initiate the flow of a detonating mixture of gases to said detonator chamber, and means for firing said detonating mixture to detonate said explosive mixture in said main chamber.

References Cited in the file of this patent

UNITED STATES PATENTS

| | | |
|---|---|---|
| 2,274,573 | Ziegler | Feb. 24, 1942 |
| 2,353,484 | Merten et al. | July 11, 1944 |
| 2,479,772 | Peterson | Aug. 23, 1949 |
| 2,545,380 | Poulter | Mar. 13, 1951 |
| 2,574,495 | Parker, Jr. | Nov. 13, 1951 |

FOREIGN PATENTS

| | | |
|---|---|---|
| 909,273 | France | Dec. 10, 1945 |